Patented May 4, 1937

2,079,347

UNITED STATES PATENT OFFICE 2,079,347

PROCESS OF PREPARING UNSATURATED SULPHATE ESTERS

Anthony James Hailwood, Altrincham, England, assignor to Imperial Chemical Industries Limited, a corporation of Great Britain No Drawing. Application September 16, 1932, Serial No. 633,451. In Great Britain September 21, 1931

2 Claims. (Cl. 260—99.12)

This invention relates to the production of new substances possessing properties that render them valuable as cleansing and softening agents for use in the treatment of textiles and textile fibres.

It is known (compare British patent specification No. 308,824) to treat oleyl alcohol with concentrated sulphuric acid or fuming sulphuric acid and in that way obtain the sulphuric ester hydroxystearyl alcohol which may be used as a wetting, cleaning and impregnating agent. It has been found that this sulphuric ester of hydroxystearyl alcohol so obtained undoubtedly possesses properties which make it valuable as a wetting and impregnating agent, but that as a detergent agent it leaves much to be desired, the reason for this being apparently that not only is there one sulphuric-ester group at the end of the $C_{18}$ carbon chain but also one near the middle. By the present invention this defect is avoided and a substance of surprisingly potent detergent properties is obtained.

The invention contemplates broadly a production of new cleansing and softening agents by converting unsaturated long chain alcohols into their sulphuric esters or salts thereof under conditions such that no attack on the unsaturated linkages takes place. Other objects will appear hereinafter.

According to the invention unsaturated long chain alcohols or mixtures thereof are treated with an addition product of sulphur trioxide and an amine or with substances capable of giving such addition product. The unsaturated long chain alkyl sulphuric esters obtained are separated in any convenient way, either as free acids or as water-soluble salts, for example, as sodium salts.

The invention is illustrated, but not limited, by the following examples in which the parts are by weight.

Example I

Fifteen parts of pyridine and 25 parts of oleyl alcohol are heated with agitation to 85–90° C. Twenty-five parts of finely divided sodium pyrosulphate are added and heating is continued until a sample is completely soluble in water. To the cool mixture is added 2.5% aqueous caustic soda solution until the reaction is alkaline and enough dilute aqeous hydrochloric acid is then added to neutralize the liberated pyridine. Sufficient sodium chloride is added to the solution so produced to make its specific gravity 1.2 and, after agitating for 12 hours, the desired product is filtered off as a white pasty solid, readily soluble in water to a clear foaming solution.

Example II

Fourteen parts of the alcohols obtained by saponification of sperm oil, 15.4 parts of sodium pyrosulphate and 8 parts of pyridine are agitated in a closed vessel at 90–95° C. until a sample is completely soluble in water. The mixture is then stirred into 200 parts of water and, after the whole has become homogeneous, dilute hydrochloric acid is added until the odor of pyridine has disappeared and a very faint acid reaction is obtained on Congo-red paper. Forty parts of common salt are then added and, after agitating for ten to twelve hours the precipitated product is filtered off, washed with 20% brine, pressed, and further dried if desired. The product is a white pasty mass giving with water, a clear frothing solution.

The unsaturated long chain alcohols to which the invention relates are those, preferably containing at least eight carbon atoms, such as are obtained either by catalytic or other reduction of unsaturated fatty oils, or the free acids derived from such oils, or other esters, amides, etc., of fatty acids (the reduction being such that the .$CO_2H$ or derived group is transformed into a .$CH_2OH$ group). Such alcohols may be obtained by saponification of certain whale oils (cf. Hilditch, loc. cit.). Thus an alcohol mixture mainly composed of oleyl alcohol is obtained by reduction of oleic acid, and oleyl alcohol also forms a large part of the alcohols obtained when sperm oil or arctic sperm oil is saponified. As additional examples of alcohols falling within the invention may be mentioned the alcohols formed by the reduction of ricinoleic, erucic, brassidic and linoleic acids. In general, alcohols of the general formula,

$$RCH_2OH$$

in which R is an unsaturated straight chain alkyl radical containing 9 to 19 carbon atoms, are preferred. Especially desirable results are obtained in the treatment of straight chain unsaturated alcohols of the character above described containing 16–18 carbon atoms. When oleyl alcohol is treated according to the invention investigation has shown that the product contains only one sulphuric ester group, and that when it is hydrolyzed oleyl alcohol is regenerated.

The addition product of sulphur trioxide and an amine used in accordance with the invention may be obtained in any suitable manner, e. g., by direct addition of sulphur trioxide to a tertiary amine, as for example, pyridine, quinoline, piccoline, lutedine, triethylamine, trimethylamine, dimethyl aniline, diethyl aniline, and the like. Other amines which form addition products with sulphur trioxide may be used, for example, secondary amines such as alkyl-o-toluidines (methyl-o-toluidine, ethyl-o-toluidine, and the like) which in many of their reactions (e. g. with nitrous acid or with alkylchlorosulphonates) behave similarly to tertiary amines. The sulphur trioxide additon product may be formed by the reaction of a sulphating or sulphonating agent with an amine. As examples of sulphating or sulphonating agents may be mentioned, sulphur trioxide, concentrated sulphuric acid, fuming sulphuric acid, halogen sulphonic acids such as chloro- and bromo- sulphonic acids, and pyrosulphates. Sulphur trioxide addition products formed from pyrosulphates may be prepared as described in British specification No. 317,736. The substance separated in accordance with the description in said specification may be used, or the addition product may be used in the nascent state, as is the case in Example I above. Especially desirable results are obtained in the use of sulphur trioxide addition products formed from sulphur trioxide, chlorosulphonic acid, or sodium pyrosulphate and tertiary aromatic amines such as pyridine and dimethyl-aniline.

The treatment with an addition product of sulphur trioxide and an amine according to the invention may be carried out in presence of any suitable solvent or diluent, for example, carbon disulphide, or in presence of an excess of amine. In practicing the invention very desirable results are obtained in the use of an excess of pyridine as a solvent or diluent.

The proportions of sulphur trioxide (or derivative), amine and alcohol used in effecting the reaction may vary widely. In general, it is preferable to employ about one to two mols of sulphur trioxide (or derivative) and the corresponding amount, or an excess, of amine per mol. of alcohol.

The temperature employed in the treatment of the alcohol with the addition product may vary within relatively wide limits. Generally speaking, it is desirable to employ a temperature below the decomposition temperature of the product but sufficiently high to render the reaction mass liquid so that it may easily be stirred or agitated. The fluidity of the reaction mass may also be regulated, of course, by the amount of solvent or diluent added. Good results have been obtained in the use of temperatures within the range of about $-10°$ C. to $100°$ C., it being understood that the reaction proceeds at high or lower temperatures. In general, temperatures of about $30\text{-}40°$ C. are preferably employed.

The long chain alkyl sulphuric esters produced in accordance with the invention are preferably recovered in the form of their water-soluble alkali metal salts by neutralization of the reaction product with an alkali metal hydroxide, e. g. sodium or potassium hydroxides, or an alkali metal carbonate. The product is preferably preserved in a slightly alkaline state.

The new cleansing and softening agents are solids with a soapy texture, dissolving freely in water. It is not necessary however, to separate the products in the form of dry solids, as they are conveniently used as pastes. Both paste and dry solid may contain inorganic salts, which may be present as by-products of the reaction, or which may be added in order to improve the cleansing properties, as I find that the addition of an electrolyte, for example, sodium chloride, or sodium sulphate improves the detergent properties of textile treatment baths. These treatment baths are prepared, by a further feature of the invention, by dissolving the new agents in water and used as such, or to them may be added other detergent agents or wetting agents, bleaching agents, solvents and the like.

As many apparent and widely different embodiments of this invention may be made without departing from the spirit thereof, it is to be understood that I do not limit myself to the foregoing examples or description except as indicated in the following claims.

I claim:

1. A process of preparing chemical products especially useful as cleansing, softening and scouring agents which comprises reacting an unsaturated long chain alcohol having 10 to 20 carbon atoms per molcule with an alkali metal pyrosulphate and an amine forming an addition product therewith.

2. A process of preparing oleyl sulphate free from sulphonation at the double bond, which comprises reacting upon oleyl alcohol with an alkali-metal pyrosulphate and pyridine, the quantity of pyridine being in excess of equimolecular proportions as compared to the pyrosulphate.

ANTHONY JAMES HAILWOOD.